US007544635B2

(12) United States Patent
Liang et al.

(10) Patent No.: US 7,544,635 B2
(45) Date of Patent: Jun. 9, 2009

(54) PROCESS FOR CHANGING HYDROPHILIC/HYDROPHOBIC CHARACTERISTICS

(76) Inventors: Zhi-Wei Liang, 595 Westley Avenue, Coquitlam, British Columbia (CA) V3J 3Y6; Wen-Xi Liang, 595 Westley Avenue, Coquitlam, British Columbia (CA) V3J 3Y6

( * ) Notice: Subject to any disclaimer, the term of this patent is extended or adjusted under 35 U.S.C. 154(b) by 900 days.

(21) Appl. No.: 10/483,885

(22) PCT Filed: Jul. 17, 2001

(86) PCT No.: PCT/CA01/01038

§ 371 (c)(1),
(2), (4) Date: Jan. 15, 2004

(87) PCT Pub. No.: WO03/008120

PCT Pub. Date: Jan. 30, 2003

(65) Prior Publication Data

US 2004/0167019 A1  Aug. 26, 2004

(51) Int. Cl.
*B01J 20/22* (2006.01)
(52) U.S. Cl. .................................. 502/401; 502/439
(58) Field of Classification Search .............. 502/401, 502/402, 403, 404, 439
See application file for complete search history.

(56) References Cited

U.S. PATENT DOCUMENTS

| 3,617,565 A | 11/1971 | Fahlvik |
| 3,652,386 A | 3/1972 | Noreus et al. |
| 3,770,575 A | 11/1973 | Ball |
| 3,864,268 A | 2/1975 | Culbertson et al. |
| 3,876,497 A | 4/1975 | Hoffman |
| 3,925,007 A | 12/1975 | Gurtler |
| 3,950,143 A | 4/1976 | Pyle |
| 4,051,050 A | 9/1977 | Elliott et al. |
| 4,065,347 A | 12/1977 | Aberg et al. |
| 4,070,383 A | 1/1978 | Rutledge |
| 4,136,021 A | 1/1979 | Whitehurst |
| 4,172,039 A | 10/1979 | Akiyama |
| 4,234,420 A | 11/1980 | Turbeville |
| 4,240,800 A | 12/1980 | Fischer |
| 4,311,553 A | 1/1982 | Akerlund et al. |
| 4,314,056 A | 2/1982 | Brewer et al. |
| 4,341,180 A | 7/1982 | Cortigene et al. |
| 4,343,680 A | 8/1982 | Field et al. |
| 4,356,060 A | 10/1982 | Neckermann et al. |
| 4,374,794 A | 2/1983 | Kok |
| 4,459,174 A | 7/1984 | Papageorges et al. |
| 4,519,918 A | 5/1985 | Ericsson et al. |
| 4,522,753 A | 6/1985 | Yannas et al. |
| 4,537,877 A | 8/1985 | Ericsson |
| 4,547,263 A | 10/1985 | Quame |
| 4,553,978 A | 11/1985 | Yvan |
| 4,557,800 A | 12/1985 | Kinsley, Jr. |
| 4,605,640 A | 8/1986 | Fanta et al. |
| 4,670,156 A | 6/1987 | Grenthe |
| 4,753,917 A | 6/1988 | Grenthe |
| 4,770,715 A | 9/1988 | Mandel et al. |
| 4,784,699 A | 11/1988 | Cowsar et al. |
| 4,784,773 A | 11/1988 | Sandberg |
| 4,787,917 A | 11/1988 | Leclerc de Bussy |
| 4,826,497 A | 5/1989 | Marcus et al. |
| 4,829,045 A | 5/1989 | Fransham |
| 4,863,885 A | 9/1989 | Degnan, Jr. |
| 4,925,343 A | 5/1990 | Raible et al. |
| 4,954,620 A | 9/1990 | Bourgeois |
| 4,969,774 A | 11/1990 | Arseneault et al. |
| 4,975,108 A | 12/1990 | Pruitt |
| 5,009,790 A | 4/1991 | Bustamante et al. |
| 5,035,804 A | 7/1991 | Stowe |
| 5,039,651 A | 8/1991 | Kosaka et al. |
| 5,089,258 A | 2/1992 | Zaid |
| 5,110,785 A | 5/1992 | Reed et al. |
| 5,114,593 A | 5/1992 | Diaz |
| 5,120,598 A | 6/1992 | Robeson et al. |

(Continued)

FOREIGN PATENT DOCUMENTS

CA    1229808    12/1987

(Continued)

OTHER PUBLICATIONS

Official Action from the Russian Patent Office and English translation thereof, no date.

*Primary Examiner*—Edward M Johnson
(74) *Attorney, Agent, or Firm*—Oyen Wiggs Green & Mutala LLP

(57) ABSTRACT

An oxidative thermochemical drying treatment of naturally occurring organic substances, to prepare a new class of hydrophobic oleophilic products, and a new class of hydrophilic oleophilic ones. The treatment comprises moistening and heating the raw materials in a thermochemical apparatus equipped with a gas flow system, in an oxidizing medium for a period of time. The efficiency of the treatment can be improved by pretreatments of the raw materials, such as by boiling in water, by soaking in acidic or alkaline solution, by mechanically expanding, by adding volatile reagents and by freezing. A special pretreatment of the raw materials with carbonate or bicarbonate results in hydrophilic oleophilic products. The series of the hydrophobic oleophilic and hydrophilic oleophilic products made from different natural substances under various oxidative thermochemical drying conditions have different characteristics and are low-cost, biodegradable, environmentally harmless and widely useful.

13 Claims, 1 Drawing Sheet

U.S. PATENT DOCUMENTS

| | | |
|---|---|---|
| 5,137,537 A | 8/1992 | Herron et al. |
| 5,160,629 A | 11/1992 | Brown |
| 5,176,831 A | 1/1993 | Rowsell |
| 5,180,704 A | 1/1993 | Reindl et al. |
| 5,186,831 A | 2/1993 | DePetris |
| 5,206,205 A | 4/1993 | Tsai |
| 5,259,973 A | 11/1993 | Lowther |
| 5,271,691 A | 12/1993 | Willett et al. |
| 5,346,549 A | 9/1994 | Johnson |
| 5,352,780 A | 10/1994 | Webb et al. |
| 5,360,654 A | 11/1994 | Anderson et al. |
| 5,370,801 A | 12/1994 | Sorensen et al. |
| 5,486,068 A | 1/1996 | Wilson |
| 5,492,881 A | 2/1996 | Diamond |
| 5,585,319 A | 12/1996 | Saitoh et al. |
| 5,590,667 A | 1/1997 | Wagner et al. |
| 5,599,764 A | 2/1997 | Sharma et al. |
| 5,609,768 A | 3/1997 | Mueller et al. |
| 5,656,490 A | 8/1997 | Wyatt et al. |
| 5,700,558 A | 12/1997 | Bopp |
| 5,705,216 A | 1/1998 | Tyson |
| 5,709,774 A | 1/1998 | Naieni |
| 5,734,031 A | 3/1998 | Lehrfeld |
| 5,744,406 A | 4/1998 | Novak |
| 5,763,083 A | 6/1998 | Berrigan |
| 5,834,385 A | 11/1998 | Blaney et al. |
| 5,849,201 A | 12/1998 | Bradley |
| 5,873,979 A | 2/1999 | Naieni |
| 5,891,937 A | 4/1999 | Berg et al. |
| 5,938,894 A | 8/1999 | Thebrin et al. |
| 6,020,278 A | 2/2000 | Gatenholm |
| 6,027,652 A | 2/2000 | Hondroulis et al. |
| 6,030,536 A * | 2/2000 | Wada et al. ............... 210/671 |
| 6,092,302 A | 7/2000 | Berrigan |
| 6,153,017 A | 11/2000 | Ward et al. |

FOREIGN PATENT DOCUMENTS

| | | |
|---|---|---|
| JP | 11009992 A2 | 1/1999 |
| RU | 2 031 849 C1 | 3/1995 |
| RU | 2098352 | 12/1997 |
| RU | 2116128 | 9/1998 |
| WO | WO 93/15833 | 8/1993 |
| WO | WO 97/07883 | 3/1997 |

* cited by examiner

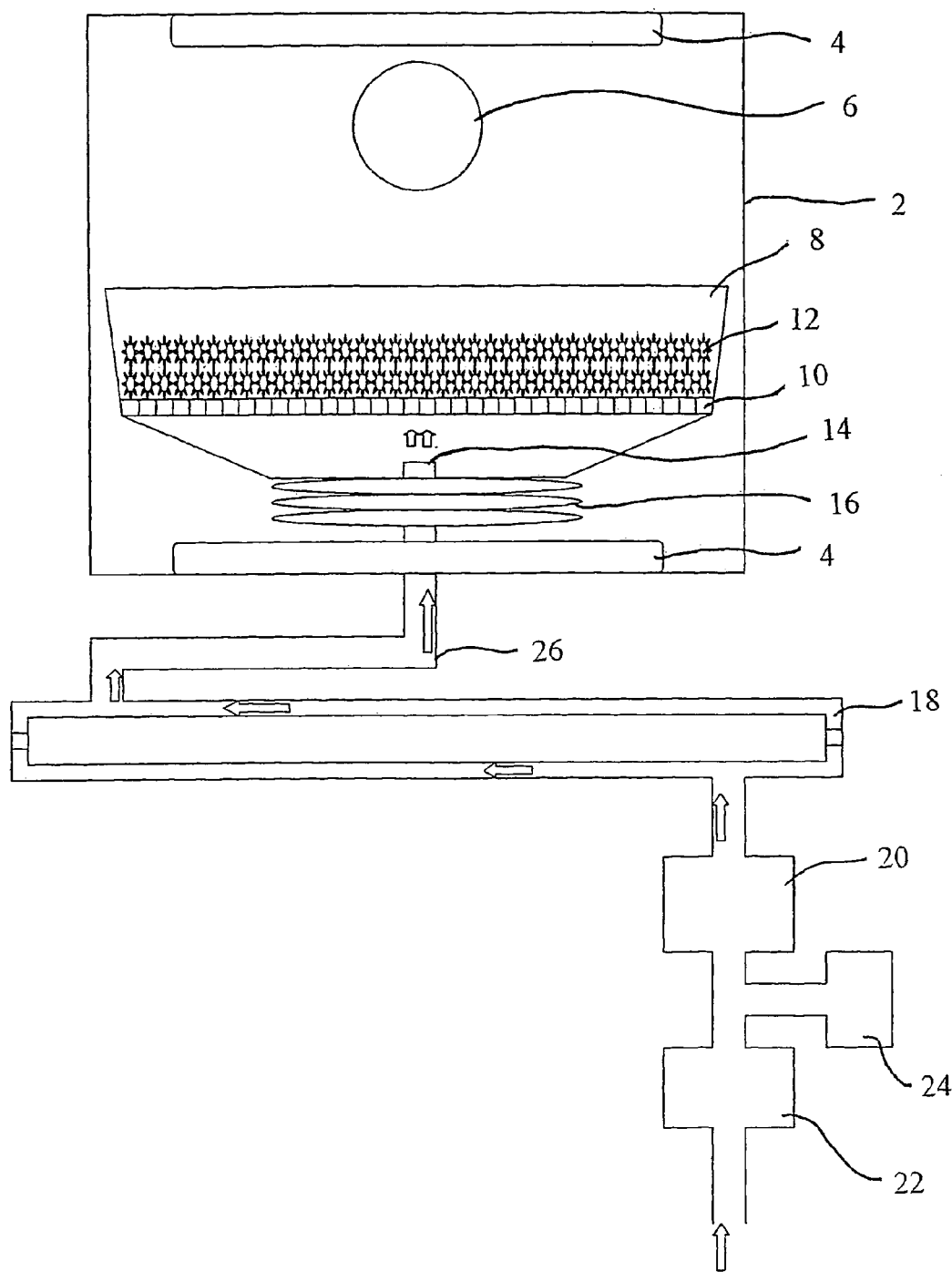

PROCESS FOR CHANGING HYDROPHILIC/HYDROPHOBIC CHARACTERISTICS

FIELD OF THE INVENTION

The invention pertains to an oxidative thermochemical drying process for producing a new class of natural hydrophobic oleophilic materials and sorbents, and a new class of natural hydrophilic oleophilic ones. The raw materials used for the process are a wide range of biomaterials, humic substances, minerals, and their derivatives. The products of the process possess low or high affinity for water and high affinity for oils, hydrocarbons, toxic metal ions, radioactive materials, pollutants and toxins, in aqueous solution, in the gas state and on land surfaces.

BACKGROUND OF THE INVENTION

Sorption has been found to be superior to other techniques for cleaning up water pollution by reason of simplicity of design, ease of operation, speed of action and insensitivity to toxic substances. There is a great demand for hydrophobic oleophilic sorbents. Key requirements of such sorbents are high selectivity, high capacity, rapid uptake, good buoyancy and long life. They have to be available in tonnage quantities at economical cost. They should have a particle size, shape and mechanical strength suitable for practical use. As the world addresses a growing list of environmental problems, the qualities of renewability, non-toxicity, biodegradability and biocompatibility of sorbents for pollution control are important.

Various materials have in the past been found useful for sorbing oils and hydrocarbons, such as the activated carbons, synthetic organic sorbents, mineral-based sorbents, coating-based sorbents, peat moss and others. These are all relatively expensive, as a result of the raw material cost, the processing cost and the packaging cost, and therefore have limited application on an industrial scale. Other common disadvantages of these known materials are briefly summarized as follows: some have low buoyancy or even sink in water; some have low oil absorption capacity; some have slow sorption; some lose the sorbed oil very easily; some lose oil absorption ability immediately after contacting water; some exhibit the same stickiness of the sorbed oil after sorption; some do not work effectively under many environmental conditions typically encountered, such as at low temperature; some have to use chemicals for modification which are themselves environmental contaminants; some are toxic; some are too light to be spread effectively in actual field use; some have limited source supply of raw material; and some are not biodegradable.

Natural plant and agricultural products and residues have long been used for sorption of oils and hydrocarbons. These materials have the advantages of being inexpensive, readily available and easily supplied in bulk, granules, mats, pads, nonwoven sheets and used in continuous-working devices. For example, untreated sawdust has been used to sorb oil, and untreated straws and feathers to clean up oil spilled on water. However, it has always been considered that the natural plant and agricultural materials sorb water too rapidly, thereby sinking, to be useful for oil and hydrocarbon control on water surface.

Because of the economic attractiveness and the environmental benefits of natural materials and biowastes as the raw materials for hydrophobic products and sorbents, a number of attempts have been made to make the naturally hydrophilic plant and agricultural materials hydrophobic and oleophilic. The modification efforts are mainly in three categories: coating, reacting and heating.

The coating process modifies the raw material by adding hydrophobic reagents or polymers to get a hydrophobic surface. Examples are shown in U.S. Pat. Nos. 4,519,918, 4,925,343, 5,021,390, 5,492,881 and 5,891,937. The additives add to the manufacturing cost of the products and can be a source of environmental contamination.

The reacting process modifies the raw material by chemical reactions. Examples are shown in U.S. Pat. Nos. 2,358,808, 3,770,575, 3,874,849 and 4,605,640. Again, the reaction agents add to the manufacturing cost of the products and may be the source of environmental contamination.

The heating process modifies the raw materials by thermochemical reactions. Hydrophobic substances are produced from the components of the raw materials themselves during the heating process. The manufacturing process is simple, low cost and has no toxic material involved. Prior heat treatments of lignocellulose materials, mainly comprise processes of thermocondensation, torrefaction and carbonization at different temperature levels. Thermocondensation is the thermochemical degradation reaction of lignocellulose material at temperature between 200° C. and 280° C. An example of such a process is shown in U.S. Pat. No. 4,954,620. Torrefaction consists in briefly exposing the lignocellulose material to a temperature between 270° C. and 300° C. while in contact with the air and under the influence of direct heat in order to cause incomplete carbonization. Examples of such a process are shown in FR 839 732 and 872 164, DE 2 802 213 and EP 0 073 714. Carbonization takes place at higher temperatures, preferably about 450° C., in order to provide maximum elimination of the tars which are generated by destruction of the ligocellulose material.

U.S. Pat. No. 4,553,978 (Yvan) discloses a process for converting ligneous matter of vegetable origin by torrefaction in a neutral atmosphere at a temperature of between 200° and 280° C., and preferably between 240° and 260° C., for a duration of 30 minutes to 5 hours.

U.S. Pat. No. 4,753,917 (Grenthe) discloses a hydrophobic sorbent which is prepared by subjecting water-containing, fibrous cellulosic products, particularly sulphite reject fibers, to rapid heating to cause expansion of the fibers through gasification of the water therein. Preferred heating is operated in a stream of high temperature air from about 500° F. to 700° F. for several minutes. After the rapid heating to expand the fibers, a thin coating of waxy material is further applied on the surface thereof.

U.S. Pat. No. 4,954,620 (Bourgeois) discloses thermocondensed lignocellulose material which has a hemicellulose content of less than 2% and a calorific value which is about 20% greater than that of the starting material is obtained by isothermochemical treatment between 220° C. and 280° C. for a period of thirty minutes using crossed flows of treated material and of oxygen-free hot gases.

U.S. Pat. No. 5,110,785 (Reed) discloses a novel composition of matter which is prepared by subjecting at least one woodlike particle such as dry pine sawdust, to selectively controlled thermolytic heating above about 280° C., but not above about 380° C., and preferably between 300° C. and 360° C. for about ten minutes to cause the hemicellulose to be converted to an oil-like oleophilic and hydrophobic substance. The heating is carried out in a rotary oven. Air circulation or the type of atmosphere is not mentioned in the heating system.

U.S. Pat. No. 5,585,319 (Saitoh) discloses a process for preparing an oil sorbent by heating lignocellulose at a temperature of 250° C. to 450° C. for 5 to 100 minutes in a rotary oven with no air inlet but an outlet which permits escape of pyrolignous acid and pyrolignous gas.

JP 62,050,393A2 (Fumiaki) discloses a heat treatment of coal by heating at a temperature of 180° C. to 300° C., with an inert gas having an oxygen content of at least 10 volume %, a hot gas containing at least 10 volume % steam, or a 100% steam for preventing the burning of coal or explosion. By heating the coal above 180° C., the internal moisture of the coal is decreased and the oxygen-containing hydrophilic groups, such as a phenol group and a carboxylic group, are thermochemically decomposed to be eliminated so that the coal becomes hydrophobic, and the hygroscopicity is decreased.

JP 11,009,992A2 (Tsutomu) discloses a gas absorbent manufactured from residues of coffee beans from which coffee components are extracted by boiling water. Residues are heat treated under oxidizing atmosphere at temperature in the range of 300-450° C.

FR 953,004 and Swiss 228,877 disclose a torrefaction operation which takes place from 250° C. to 350° C. and from 250° C. to 300° C. respectively, without any precision relative to the atmosphere in which the operation is carried out, from which it is concluded that the atmosphere is of no particular importance and that, in practice, the operation is carried out in a normal ambient atmosphere.

Generally, high temperatures are supplied for a short time under non-oxidizing gas medium or wet steam atmosphere in the prior art heating processes. When an air medium is used, it is simply because air is the most economical and readily available atmosphere, not for the purpose of oxidation.

Oxidation or ozonation treatment is well known in industrial applications, such as for pulp bleaching in paper industry and for fiber activating in graft polymerization. The treatment is usually carried out in high concentration of oxidant at low temperatures in aqueous environment. The products are usually hydrophilic. U.S. Pat. No. 4,459,174 (Papageorges) discloses a process for the delignification and bleaching of chemical and semi-chemical cellulosic pulps in which the pulp is subjected to a treatment with oxygen in an alkaline medium at a temperature of between 353° and 423° K (80° and 150° C.), and a subsequent treatment with peroxide at a basic pH. U.S. Pat. No. 4,120,747 (Sarge, III) discloses a soft, hydrophilic absorbent, bulky-paper web formed by thermo-mechanically defibrated pulp from wood chips which have been soaked in chemical solutions prior to defibrating and then treated with ozone at a temperature of from 40° to about 55° after defibrating. U.S. Pat. No. 6,020,278 (Gatenholm) discloses a method in graft polymerization for the production of highly hydrophilic absorbent hybrid fibers by ozoning at a temperature of in the region of 15-60° C. during a period of time which lasts up to 90 minutes, preferably in the form of steam. U.S. Pat. No. 5,549,789 (Atalla) discloses a method for wet oxidative degradation of lignin and polysaccharide fragments dissolved during polyoxometalate delignification or bleaching of wood fibers or wood pulp to volatile organic compounds and water. U.S. Pat. No. 5,346,549 (Johnson) discloses a method of producing environmentally stable formed bodies useful as building material comprising paper-mill sludge, ash and water treated with an oxidant and exposed to electromagnetic energy, preferably ultraviolet light, at ambient temperature and without the use of a drying oven. WO 88/09622 (Olson) discloses a method for reducing the amount of oxalic acid and/or sulfites in a sugar beet with an oxidizing compound such as hydrogen peroxide at about 30° to 60° C.

With respect to making hydrophilic products, some efforts have been made to alter hydrophobic surfaces into hydrophilic ones by oxidation at low temperatures. For example, U.S. Pat. No. 5,369,012 discloses a method of producing an organic polymer membrane that is made hydrophilic by exposing a hydrophobic surface of the article to atomic oxygen or hydroxyl radicals at a temperature below 100° C., preferably below 40° C., to form a uniform hydrophilic surface layer of hydrophilic hydroxyl groups. Some efforts have also been made by heating with or without crosslinking agent. For example, U.S. Pat. No. 5,137,537 (Herron) and U.S. Pat. No. 5,873,979 (Naieni) disclose a hydrophilic absorbent structure containing individualized, polycarboxylic acid crosslinked cellulosic fibers by heating uncrosslinked cellulosic fibers with an amount of $C_2$-$C_9$ polycarboxylic acid crosslinking agent in an intrafiber ester crosslink bond form. The heating is carried out for a period ranging from 5 seconds to 2 hours at an air temperature of 120° C. to 280° C. to remove any remaining moisture content and cause crosslinking to occur. Preferably, the crosslinking agent is citric acid. U.S. Pat. No. 5,709,774 (Naieni) discloses a method of preparing heat-treated-in-air high cellulosic fibers, for use in absorbent structures, which are free of moieties from crosslinking agents by fluffing and heating in air at atmospheric pressure at a temperature ranging from 120° C. to 280° C. for at least 5 seconds.

SUMMARY OF THE INVENTION

We have discovered that some plant and agricultural materials with low oil absorption but high water affinity can be modified by a dry heat treatment with effective airflow at moderate temperature to increase their hydrophobicity and oleophilicity. The efficiency of the heat treatment can be further improved by introducing active oxygen species such as ozone. The products become hydrophobic and oleophilic.

In accordance with this discovery, it is an object of present invention to provide a series of novel inexpensive and fast-acting compositions for sorption of oils and hydrocarbons on site. The compositions are easily applied to the oil or hydrocarbon contaminated site and easily recollected and treated thereafter. The compositions have good buoyancy and can float for a long period on the water surface before and after absorption of oils and hydrocarbons. They have high sorptive capacity for removing oil and hydrocarbon from the surface of water and retaining them until the oil contaminated composition is removed.

It is an object of the invention to provide efficient novel compositions that can sorb oils and hydrocarbons even after being contacted and partially saturated with water.

It is also an object of the invention to provide novel compositions for the absorption of oils and hydrocarbons not only in the liquid phase but also in the gas phase, such as cigarette smoke and automobile exhaust gas, as well as on solid substrates, such as oil contaminated soil and beaches.

It is another object of the invention to provide novel sorbents not only for high absorption for oils and hydrocarbons but also for binding of toxic metal ions, radioactive materials and other pollutants.

It is another object of the invention to provide novel products not only for sorbents but also for various other applications, such as for the materials of insulation, building, filling, package, household items, disposable eating utensils, sanitary products, textile, animal bedding and litter, soil conditioner, bioaffinity chromatography, medicine carrier and food.

It is yet another object of the invention to provide a novel process that is simple, low cost, environmentally harmless and efficient to prepare hydrophobic oleophilic products and sorbents, as well as hydrophilic oleophilic ones.

It is a further object of the invention to provide a process to alter natural hydrophilic substances into hydrophobic oleophilic products with different degrees of hydrophobicity according to the requirements of the products.

It is a further object of the invention to provide a process to introduce some functional groups into the final product by pretreatment of the raw materials with chemicals.

It is a further object of the invention to provide a series of novel compositions that can be produced on a large industrial scale. The compositions can be considered as disposable products and sorbents, which can be recovered or disposed of in an economical and safe manner after use. They are environmentally harmless and safe, stable and biodegradable.

It is a further object of the invention to provide a process which can use readily available agricultural and forestry products, plant organisms, animal organisms, crustaceans' shells, in whole or in part or derivatives thereof, and waste products, as the raw materials for making hydrophobic oleophilic and hydrophilic oleophilic products and sorbents.

It is another object of present invention to provide novel products and sorbents available in all the possible physical forms, such as powders, mats, pads, socks, booms, pillows, papers, cloths, non-woven sheets, column packings and used in continuously working devices. The products and sorbents can also be prepared from the primary and secondary products made of the raw materials.

The present invention discloses a general process of treating natural resources to change the hydrophilic/hydrophobic characteristics. The process is simple, easy, efficient, low cost, and environmentally harmless. The oxidative thermochemical drying process causes the components in the natural resources, such as cellulose, hemicellulose, lignin, starch, pectin, chitin, proteins, polyphenols, humus, and combinations thereof, to be oxidized and partially degraded, and to become hydrophobic oleophilic, or hydrophilic oleophilic, depending on different pretreatment methods. The natural resources comprise a wide range of biomaterials, humic substances, minerals and their derivatives, such as wood, barks, leaves, straws, stalks, husks, shells, roots, flowers, seeds, beans, grasses, piths, flours, seaweed, sponge, bagasse, sugar sorghum, sugar beet, rice, wheat, corn, rye, barley, oats, millet, bast, linen, ramie, peanut, oil palm, tobacco, tea, cotton, cloth, papers, carton boxes, pulps, composted municipal wastes, yard wastes;, mushroom culture residues, feathers, wool, hairs, algae, fungi, bacteria, peat moss, lignite, charcoal, crab shells and shrimp shells. The process for preparing the hydrophobic oleophilic products and sorbents or the hydrophilic oleophilic ones comprises heating the moistened raw materials in a thermochemical convection apparatus or kiln equipped with a gas flow system, in an oxidizing medium such as air or a mixture of fresh air and ozone, at a temperature of 80° C. to 700° C., preferably 110° C. to 300° C., for a predetermined period of time. The efficiency of the treatment to produce hydrophobic oleophilic characteristics can be improved by one or certain combinations of the following pretreatments of the raw materials, such as by boiling in water, by soaking in acidic or alkaline solution, by mechanically expanding, by adding volatile reagents and by freezing. One unique pretreatment with carbonate or bicarbonate of the raw materials, however, results in hydrophilic oleophilic bi-functional products. The series of the hydrophobic oleophilic and hydrophilic oleophilic products made from different natural resources under various oxidative thermochemical drying conditions have different characteristics and are at low-cost, efficient, biodegradable, environmental harmless and widely applicable. Those products having the capability of instant and tight sorption of oils, hydrocarbons, toxic metal ions, radioactive materials, hydrophobic pollutants and toxins, can be used widely as sorbents, carriers and fencing materials in aqueous solution, in gaseous state or on land areas. Those products having water resistant, non-hygroscopic, rot-proof, fungal-resistant, bacteria-resistant, shock-absorbing, fire-retardant, dimensionally stable, delignified, and lipophilic characters can be used widely in applications such as for materials of insulation, building, filling, household items, disposable eating utensils, packaging, sanitary products, bioaffinity chromatography, animal bedding and litter, soil conditioner, textile, medicine carrier and in the food industry. Those products having improved energetic power can be used for energy production. Products released from the oxidative thermochemical drying process as byproducts can be used as chemicals. The hydrophilic oleophilic product could also find use in general purpose products and absorbents for such applications as diapers and catamenia devices, as well as for industrial applications.

BRIEF DESCRIPTION OF THE DRAWING

The drawing is a schematic view of an apparatus for carrying out the method of the invention.

DESCRIPTION OF THE PREFERRED EMBODIMENTS

The process for preparing the hydrophobic oleophilic products comprises heating the moistened raw materials in a thermochemical convection apparatus or kiln equipped with a gas flow system, in an oxidizing medium, such as air or a mixture of fresh air and ozone, at a temperature of 80° C. to 700° C., preferably 110° C. to 300° C., for a duration of 16 minutes to 24 hours, preferably a duration of 1 hour to 10 hours. For producing the hydrophilic oleophilic products of the invention, the heating and oxidizing duration is 1 minute to 24 hours, preferably 5 minutes to 10 hours, and the raw materials are pretreated with carbonate or bicarbonate.

The raw or starting materials are naturally-occurring organic substances. They consist of a wide range of biomaterials, humic substances, minerals and their derivatives, containing components of polysaccharides, heteropolysaccharides, polyphenols, proteins, humus, and combinations thereof. Suitable raw materials include wood, barks, leaves, straws, stalks, husks, shells, roots, flowers, seeds, beans, grasses, piths, flours, seaweed, sponge, bagasse, sugar sorghum, sugar beet, rice, wheat, corn, rye, barley, oats, millet, bast, linen, ramie, peanut, oil palm, tobacco, tea, cotton, cloth, papers, carton boxes, pulps, composted municipal wastes, yard wastes, mushroom culture residues, feathers, wool, hairs, algae, fungi, bacteria, peat moss, lignite, charcoal, crab shells and shrimp shells, and mixtures of these materials.

The physical form of the raw material has a significant effect on the efficiency of the oxidative thermochemical drying process. The best efficiency is achieved when the structure and the reacting groups of the raw material are exposed to the oxidative medium and heating temperature as much as possible. Therefore, small sized or thin layered are the preferred physical forms of the raw material. However, when other factors such as the processing cost, balance of cost and efficiency, and the desired physical form of the end products are considered, the readily available natural form of the raw material may be preferred in some instances without the need for processing into granular form.

Products made of the raw materials, such as straw bags, knitted goods, cloth, paper, disposable eating utensils, carton boxes, etc. can be used as the starting materials as well. It is both economical and practical to use waste products or pre-made products for the starting materials.

The raw material may be dry but is preferably moistened prior to heating. Dry raw materials are more resistant to the oxidative thermochemical drying process then moistened ones. When dry raw materials are heated under the oxidative drying condition, the risk of the materials smoking and catching fire is much higher than with the moistened raw materials. Also, less increase in hydrophobicity is achieved where dry raw materials are used in the process. Moistening the raw materials lowers the risk of the materials smoking and catching fire during treating, expands the materials to produce a more porous structure and permits extension of the heating period for better oxidation. Moistening the raw material is also believed to promote free-radical reactions, which may play an important role in changing hydrophilic and hydrophobic characteristics during the oxidative thermochemical drying process. The precise amount of moisture is not of critical importance. However, when the raw materials contain too much moisture, extra energy is needed for water evaporation. If the raw material contains in excess of 60-70% moisture by weight, it is preferred to remove the excess moisture by mechanical means such as squeezing, centrifuging and air drying before carrying out the oxidative thermochemical drying reaction. Removing excess moisture in the raw material is also important where the materials are pre-treated, as discussed below.

In this specification, the term "drying" as applied to the oxidative thermochemical process refers to the reduction of moisture in the end product relative to the moistened starting materials. It is to be understood that in the course of the process, in some embodiments, additional water may be added to the organic substance being treated, but in all cases the end product is drier than the starting materials.

The duration of the oxidative thermochemical drying process depends on the nature of the raw material, the physical form of the raw material, the quantity of raw material in the heating apparatus, the oxidizing medium, temperature, the speed of circulation of the oxidizing medium, and whether a catalyst is employed.

The particular form of thermochemical convection apparatus or kiln used for the oxidative thermochemical drying reaction is not critically important, as long as it is capable of generating the required treatment temperatures and producing efficient air circulation and oxidative medium supply in order to rapidly heat the raw materials to the required temperature and to get rid of the moisture and volatiles released from the materials.

The drawing shows a preferred embodiment of the apparatus for carrying out the process of the invention. Convection oven 2 has heating elements 4 and turbo fan 6. The oven includes vent ports (not shown) to allow free escape of any gaseous substances therein. The oven is equipped with an open sample reaction container 8, which has a screen 10 to support sample 12 in order to ensure the even passage therethrough of the reacting oxidizing medium, and a gas inlet 14 at bottom of the container to connect a positive-pressure ventilation system. The ventilation system has a heating coil 16 through which inflowing oxidizing gas is pre-heated through passive thermal conductance of oven heating. One end of the coil is connected with the gas inlet 14 and the other end is connected with the part of the ventilation system external to the oven, through gas conduit 26. The gas conduit 26 connects with, in succession: an inside-installed ultraviolet lamp 18 (254 nm, 5 watts effective), a gas flow meter 20 and a gas supplier such as air compressor 22 or other gas suppliers 24. The flow rate of gas is adjustable from 0.25 L/min to 10 L/min.

The operation preferably takes place at atmospheric pressure though increasing the gas pressure in the apparatus may be done if desired. Batch, semi-continuous or continuous processings are all suitable. Other ways of heating, such as microwave, high frequency heating and infrared rays; are also suitable for the thermochemical apparatus. Flash drying, which heats and dries the material in a high velocity air stream at an elevated temperature, can also be used in the present invention. The oxidative medium is the environment to which the raw materials are exposed to during the oxidative thermochemical drying treatment. It can be in gaseous or aqueous state, such as air, oxygen, ozone, hydrogen peroxide or any oxygen-containing material capable of releasing oxygen or highly reactive free radicals under the oxidation conditions. It is preferred to use the active oxidizing agents such as a mixture of fresh air and ozone for the oxidative medium at an applied temperature below 250° C., at which temperatures ozone is not thermochemically decomposed too rapidly. Ozone is immediately converted back into oxygen at a temperature of around 270° C. (518° F). It is preferred to use air, a mixture of air and oxygen, liquid oxidant, or other thermochemically stable oxidants as the oxidative medium for temperature above 250° C.

Dry oxidative gaseous medium is preferably used for the whole oxidative thermochemical drying process. However, it is also suitable to use wet oxidative gaseous medium such as a mixture of steam and ozone for the first half of the oxidative thermochemical treatment, then to use dry oxidative gaseous medium for the last half of the treatment to dry the final products. For materials which when heated are susceptible to smoking, catching fire or having their structure destroyed, or when high mechanical strength of the treated product is needed, it is preferred to have the two stages of oxidation, namely first the wet heating with wet oxidative gaseous medium and then the dry heating with dry oxidative gaseous medium, and to extend the wet heating period:

Preferably, the raw materials should be contacted with the oxidative medium as much as possible in order to optimize interaction of reactants, increase the rate of reaction and minimize the time required to oxidize the materials to acceptable levels. The efficiency of oxidation can be further improved by introducing a catalyst, such as metallic iron and metal oxide, to accelerate the oxidation reaction and to minimize the time required to oxidize the raw material to acceptable levels.

The conditions during the oxidative thermochemical drying process can be altered in order to get better results with certain materials. Such alterations include, (1) applying different oxidative media at different stages of the process; (2) applying a higher concentration of oxidative agent at the beginning of the treatment when the raw material is moistened and changing to a lower concentration later, and vice versa; and (3) applying a higher temperature at the beginning of the treatment when the raw material is moistened and changing to a lower temperature later, and vice versa.

It is an advantage of the present invention that the oxidative thermochemical drying treatment can detoxify or denature some chemical components or bio-toxins in the raw material. This is useful when waste organic sludge or bacteria culture is used as the raw material, or when the natural raw materials are contaminated. Thus, the products and sorbents of the present invention are rendered much safer than the original raw materials.

It is realized that there is a high risk of combustion and explosion to use pure ozone or concentrated oxygen at high temperature. Explosions of gaseous ozone can be initiated by shock wave, electrical spark, heat, or sufficiently intense light flash. Explosion of pure liquid ozone and concentrated solution in oxygen can be initiated by impurities, sudden change in temperature or pressure, heat, electrical spark, or mechanical shock. However, the applied concentration of ozone in the present invention is maintained low enough to minimize the risk of combustion and explosion.

In order to increase the efficiency of the oxidative thermochemical drying process, the raw materials are preferably subjected to one or certain combinations of the following pretreatments. Pretreatment of the raw materials is done principally to expand, increase the surface area, develop porosity, weaken or destroy the hydrogen bonds, produce amorphous regions, increase the reactivity and partially destroy the original structure, thereby exposing as much as possible of the reacting groups for the oxidative thermochemical drying reaction.

Pretreatment by boiling in water: the raw material is boiled in tap water for 1 min to 30 min, then excess water is squeezed out. Some hot-water soluble components are removed by this step.

Pretreatment by mixing with acidic solution: the raw material is mixed and moistened with millimolar up to molar concentrations of acid or acids, such as citric acid, acetic acid, formic acid, oxalic acid, lactic acid, phosphoric acid and phytic acid. Pretreatment by mixing the raw material in alkaline solution, such as in saturated lime water and 5% sodium hydroxide, is also acceptable, though it is not as efficient as an acidic solution. Better hydrophobicity is obtained after adding this step.

Pretreatment by mechanically expanding: the raw material is expanded with the commonly known expanding techniques, including dry expanding or wet expanding. The pretreatment results in a more porous structure, breaks the intra- and inter-hydrogen bonds and exposes more reacting groups in the raw material.

Pretreatment by mixing with volatile reagents: the raw material is moistened with volatile reagents, such as alcohols, acetone, n-heptane, n-pentane and iso-pentane. The purpose is also for expanding and exposing.

Pretreatment by freezing: the raw materials are put into a freezer or mixed with liquid nitrogen at a temperature between 0° C. and −195° C. for a sufficient time, then used directly in the oxidative thermochemical drying reaction. The crystallized structure formed by freezing is susceptible to the oxidative thermochemical drying treatment. The fast heating rate and the large temperature difference between the freezing and thermochemical treatment help to denaturize the structure of the raw materials.

When various chemicals were tested for the pretreatment of raw materials, it was found that many of them have little or limited effect on the hydrophobic/hydrophilic characteristics of the final product. Therefore, it is an advantage of the present invention to use waste products or contaminated products which contain complicated inorganic and organic components, such as waste paper sludge, as raw materials, without an expensive cleaning step.

Pretreatment together with the oxidative thermochemical drying treatment can provide a general process to introduce some functional groups into the final product for certain applications. For example, pretreatment by chemicals with functional groups such as sulfuric acid, nitric acid, phosphoric acid, phytic acid, citric acid, EDTA and formaldehyde, could introduce functional groups into the final product for special purposes, such as ion exchange function.

The reason why the oxidative thermochemical drying treatment changes hydrophilic substances into hydrophobic oleophilic ones is not clear yet. The ozone-related oxidation may involve two processes, a direct ozone attack process and a hydroxyl radical-based process corresponding to the action of hydroxyl radicals. The rate constant of direct molecular ozone consumption depends on pH. Low pH and high carbonate or bicarbonate concentration encourage direct molecular attack. Ozone consumption by the hydroxyl radical-based process depends on the concentration of radical traps, aqueous environment, pH, and the amount of directly consumed ozone. Indirect hydroxyl radical attack is favored by high pH, low concentration of radical scavengers, and presence of activating substances, such as hydrogen peroxide or ultraviolet (UV) light, to induce the decomposition of ozone in water. There are some indications that the hydroxyl radical-based process may play an important role in the ozone-related oxidative thermochemical drying process. Moistened raw materials, which supply a wet environment, seem to be much favored by the hydroxyl radical-based process. Oxidation occurs easily in the amorphous regions of the raw materials. Thus, pretreatments of the raw materials in order to get higher content of amorphous portions and high content of exposed reacting groups is highly preferred. The hydrophobic character of the products is probably related to two aspects of the products, extractable components and modified components. The extractable components are relatively smaller molecules that are organic reagent extractable, mostly located on the surface of the products to form a hydrophobic layer. The modified components are the oxidized, partially degraded but still large molecules, which form the hydrophobic backbone of the products. The non-specific modification and partial degradation of the raw materials under the oxidative thermochemical conditions result in a higher stability of the high molecular products. The primary oxidative degradation is due to the cleavage of water and carbon dioxide, in the loss of hydroxyl groups from the main constituents, together with a simultaneous decrease in the hydrophilic character of the products. Although most of the initial extractives in the raw materials are probably evaporated during the treatment, main constituents are also gradually converted into the modified components and extractive components including various volatile products. Sample #16 in Example 11 (described below) shows that sawdust was treated at 350° F. (177° C.) for 2 hours to produce a brown colored hydrophobic oleophilic sorbent. Changes in the color, or a decrease in brightness of the materials during the oxidative thermochemical drying process, is a consequence of the formation of degradation products containing different chromophoric moieties such as conjugated carbon-to-carbon double bonds and carbonyl groups. It is believed that both the oxidative and thermochemical factors are important to produce the hydrophobic oleophilic products and sorbents. Sample #17 in Example 11 (described below) shows that sawdust can be treated at a temperature as low as 250° F. (121° C.) for 6.5 hours to produce a sorbent with a color similar to that of the raw material. Hydrophobic components can be produced during the oxidative thermochemical drying treatment at low temperature, not necessarily accompanied by large degradation or torrefaction or carbonization. During the heating process at low temperature, oxidation is the dominant factor, while there is no or very little degradation or torrefaction or carbonization occurred. When the raw materials are heated at higher temperature, the oxidation is speeded up significantly, while it is accompanied by a large amount of degradation. The higher the temperature, the faster the oxidation speed, and the faster the degradation speed. It is reasonable to believe that most of oxidation occurs on the surface of the material. It is believed that the oxidation is the most important contributor to the hydrophobic characteristic, the temperature helps to speed up the oxidative efficiency, and the first wet-then drying environment directs the nature of the oxidation.

Generally, nearly all the pretreatments by various chemical or physical methods of the raw materials result in more or less hydrophobic oleophilic improvement after the oxidative thermochemical drying process. However pretreatment with millimolar concentration of carbonate or bicarbonate leads to a different result, namely a significant increase in hydrophilicity together with some oleophilicity. The theoretical explanation for it is not clear yet. It may relate to the inhibition of the free-radical chain of the ozone decomposition when ozone is applied as the oxidative medium. Carbonate and bicarbonate ions are well-known inhibitors and radical scavengers of the free-radical reaction which are capable of consuming OH radicals. Carbonates or bicarbonates may, as radical scavengers, stabilize the ozone with two results: (1) more ozone will become available for direct and more selective reaction; (2) less OH radical-induced oxidation will occur. Thus, the presence of carbonates or bicarbonates may influence the nature of the ozonation reactions. Bicarbonate is a well known baking powder and deodorant material. The present invention finds a new use for carbonate and bicarbonate, and provides a general, low cost process to make hydrophilic oleophilic products from natural resources. The products are weakly alkaline, which is a benefit in that it allows extended storage of the product without infestations. The product, with or without further neutralization, can also be used for absorbent papers, sorbents, sanitary products, animal bedding and litter, and as absorbents in industrial applications.

Numerous variants of the oxidative thermochemical drying process, such as the differences in nature of the raw materials, pretreatments, concentrations of ozone, ratios of fresh air and ozone, air flow speeds, temperature levels, heating rates and duration of heating, all provide different orientation, different efficiency of the processes, different degrees of hydrophobicity, and enable the process to supply a series of hydrophobic oleophilic products and sorbents or hydrophilic oleophilic ones.

The hydrophobic oleophilic sorbents produced by the invention have high sorbing rates, large sorption capacities and good retentivities of oils and hydrocarbons in aqueous solution. The products sorb at a rate in a time range from seconds to minutes. The sorbents have sorptive capacities from 2-35 liters oil per kilogram sorbent on a water surface and remain floating.

The hydrophobic oleophilic sorbents produced by the invention have light density, high hydrophobicity and acceptable mechanical strength. The sorbents retain the ability to hold the sorbed materials in water and float on the surface of water for long periods of time, so they can be readily collected, recovered and disposed of later.

An important feature of the hydrophobic oleophilic sorbents of the invention is that they can still sorb oils and hydrocarbons even after being contacted and partially saturated with water. When oil is applied to the sorbent that has been partially saturated with water, the oil can replace at least a portion of the water sorbed. The oil sorption capacity of the sorbent is gradually decreased as the time passed after being shaken with water.

Another important feature of the hydrophobic oleophilic sorbents of the invention is that when granulated sorbents are applied to viscous, heavy oil (e.g., crude oil) on a water surface, the resultant agglomerate sorbent/oil/water complex become relatively non-sticky. Thus, the complex can be removed from the site with relatively ease.

The present hydrophobic oleophilic sorbents are also able to sorb emulsified oil with high sorption capacity. However, they are not able to sorb oil treated with detergent.

The oil sorption capacity and hydrophobicity of the present hydrophobic oleophilic sorbents are retained well at a pH of 1-10, NaCl concentrations of 0-30%, and temperature of 0°-100° C. Therefore, the sorbents in the present invention can be used for oil cleaning on site, such as the oil-spill cleaning treatment on the sea.

The sorbent products according to the present invention are hydrophobic and oleophilic, and display excellent sorption affinity for oils, such as gasoline diesel fuel, motor oil, paraffin, crude oil, heavy oils, canola oil, corn oil, as well as other hydrocarbons such as acetone, acetonitrile, aniline, benzene, butanol, carbon disulfide, carbon tetrachloride, chloroform, cyclohexane, dichloromethane, diethanolamine, dioxin, ethanol, ethyl ether, ethylene glycol, formaldehyde, heptane, hexane, hexene, isobutanol, isopropanol, kerosene, methanol, pentane, petroleum ether, phenol, propanol, propylene glycol, tetrahydrofuran, toluene, and xylene. The sorbents are also able to bind a wide range of chemicals such as synthetic oils and fuels, coolants, solvents, paints, aromatics, sulfides, pharmaceuticals, polymers, insecticides, fungicides, herbicides and radioactive materials. In the case of hydrocarbons with higher density than water, such as aniline, methyl benzoate, benzyl alcohol, carbon tetrachloride, diethanolamine, dimethyl phthalate and ethylacetoacetate, the hydrocarbons sink to the lower phase after mixing with water. When the sorbents are applied to the surface of water phase and shaken, they will rapidly sink to the lower phase to sorb the chemical.

The hydrophobic oleophilic products of the invention have been found efficient in sorbing oils or hydrocarbons in gas phases, such as filtration of the cigarette smoke, filtration of automobile exhaust gas and indoor air cleaning to remove offensive odors and smells, such as formaldehyde, hydrogen sulfide, thiols and ammonia. The hydrophobic oleophilic sorbents should have a strong binding to the highly lipophilic toxins such as dioxin.

The hydrophobic oleophilic products can also remove oils and hydrocarbons from locations such as soil, sand, concrete, stone, grass land, container, hand, deck, beach and shore wherever it adheres to. For example, cleaning an oil contaminated beach can be accomplished by applying the sorbent on the oil contaminated areas and letting it suck up the oil for some time. Then the sorbent-oil complex can be lifted up by water. The floating sorbent/oil/water complex can be collected by mechanical means.

The hydrophobic oleophilic sorbents of the present invention have minor binding capacity of toxic metal ions and other toxins. The binding capacity for inorganic heavy metal ions such as lead and mercury is about 1 mg $Pb^{2+}$ per gram sorbent, and about 1 mg $Hg^{2+}$ per gram sorbent.

Since the hydrophobic oleophilic or hydrophilic oleophilic sorbents of the present invention are low cost, efficient and widely applicable, they can be used to partially replace or used together with the widely used but expensive activated carbon and activated carbon fibers, at least in some fields. Furthermore, the products of the present invention can be used in combination with other commercial sorbents and/or in combination of other non-sorption processes to obtain the maximum cleaning efficiency on various contaminants at different concentrations.

The products of the present invention can be made in any desired physical form, such as particulates, granules, pellets, filaments, boards, blocks, entire bodies in their natural state, bulks, mats, pads, socks, rolls, booms, pillows, blankets, strings, ropes, papers, cloths, non-woven sheets, thin films, membranes, column packings and the like.

The sorbents from various raw materials in present invention have different aspects in adsorption and absorption. For instance, in the cases of the sorbents made of straw cuts, pulverized forms made after the oxidative thermochemical drying treatment have about 50-100% increase of sorption than the unpulverized ones. In contrast, the sizes of the sorbents made of leaves and shells are not of critical importance to the efficiency of sorption. The oxidative thermochemical drying treatment of the present invention improves both adsorption and absorption of the sorbents. Some types of the raw materials get better improvement in adsorption than in absorption in the production process, while other types get better improvement in absorption than in adsorption. Thus, a combination of sorbents, which may comprise one or more sorbents from different sources prepared according to this invention, together with other types of sorbent materials and/or other materials possessing some functional groups, is highly useful.

It is another advantage of the present invention to be able to mix the raw materials from different sources for oxidative thermochemical drying treatment at the same time. Different natural resources have different initial extractable components and different produced ones during the treatment. To maximize the hydrophobic characteristics contributed by the extractable components which are transferable among the treated materials, it is beneficial to treat the mixed raw materials together, especially when those raw materials have highly hydrophobic and high percent extractable components.

After the sorbents have been saturated with oil or hydrocarbon, a certain amount of the sorbed material may be recovered by compressing, vacuuming or centrifuging the collected sorbent/chemical mixture.

The products of the invention can be used as disposable sorbents on a one-time basis, which can be disposed of in an economical and safe manner after sorption by incineration, landfill or biodegradation. Recovery means of the used sorbents are also available, which is similar to the oxidative thermochemical drying treatment, permitting the sorbents to be reused.

The products of the invention which are water resistant, non-hygroscopic, rot-proof, fungal-resistant, bacteria-resistant, fire-retardant, shock-absorbing, and dimensionally stable can be used in applications such as for materials of insulation, building, filling, package, household items, disposable eating utensils, papers, sanitary products, animal bedding and litter, soil conditioners and textiles.

The products can be used in the food industry. The products made of lignocellulose-containing fiber materials are delignified during the oxidative thermochemical drying treatment, especially at high temperatures. This process provides food and dietary fiber for consumption in both humans and non-human mammals. The products can also provide a food-safe manner, which can be incorporated into the normal cooking process and cooking area to absorb excess fat, oil and grease.

The products can be used as carrier materials to hold or retain the sorbed hydrophobic lipophilic substances for delayed release over a period of time, such as medicine-carrier, herbicide-carrier, insecticide-carrier and fertilizer-carrier.

It is possible to install an apparatus of the type depicted in the drawing into a vehicle to provide a convenient and an on-site service to supply the products to where there is a need, especially to locations where commercial products are not available for some reason, for example due to poor transportation.

The products of the invention are safe, stable and rapidly biodegradable. They are environmentally harmless and environmentally friendly, in their production, use and disposal. The oxidized or ozonized products have an increase in biodegradability compared to that of the raw materials.

EXAMPLES

In the examples, described below, the following tests were performed on the products of the oxidative thermochemical drying process.

(a) Test of Water Sorption and Sinking Percentage:

A fixed amount of the product is shaken vigorously with fresh water in a capped bottle for 10-30 seconds to make thorough contact of the product and water. The shaken product is left to stand; for a while until layering is re-established. The percentage of product sinking to the bottom at different times is recorded. The bottle is shaken vigorously before each recording. The result of the test indicates hydrophobic/hydrophilic character. Fast sorption of water and high percentage of sinking product in short time indicate a strong hydrophilic character, while slow sorption of water and small percentage of sinking product for long time indicate a strong hydrophobic character.

(b) Test of Oil Sorption:

A quantity of waste motor oil is poured onto the surface of water, and then a fixed amount of the product of the invention is applied to the oil and allowed to pick up the oil spontaneously for a while followed by a gentle stirring. The amount of oil used is enough to fully saturate the product. The oil-saturated product is removed with a strainer, and allowed to drain for 5 minutes to get rid of the excess oil. The volume of the unbound oil is measured or the oil-product mixture is weighed. The oil sorption capacity is calculated in terms of milliliter oil per gram dry product or gram oil per gram dry product. The result of the test indicates the oleophilic character of the product.

(c) Test of Oil Sorption after Short Water Contact:

A fixed amount of the product is stirred with fresh water for 10-30 seconds to make thorough contact of the product and water until the product is wetted. The vessel is left to stand for half a minute, and then waste motor oil is added with stirring until no more oil can be sorbed. The total volume of added oil is recorded. The oil-saturated product is removed with a strainer, and left to drain for 5 minutes to get rid of the excess oil. The volume of the unbound oil is measured. The oil sorption capacity is calculated in terms of milliliter oil per gram dry product.

The result of the test indicates the hydrophobic oleophilic character of the product.

Example 1

Various Hydrophobic Oleophilic Sorbents Prepared Under Basic Oxidative Thermochemical Drying Condition Various raw materials, collected from farm and market without further treatment, comprising wood sawdust, bamboo sawdust, grasses, peanut shell, bamboo leaf, corn leaf, corn stalk, corn silk, tobacco, straws, corn stalk, bagasse, sugar sorghum, wild rice stem, reed, absorbent cotton, pine needle, carton box, cloth, rice husk, bean husk, coconut husk, peat moss, hair, paper and cellulose sponge were processed in a preheated oven at 250° F. (121° C.) for 4-7 hours, with no convection and ventilation, and no ozone applied.

All the processed products showed a significantly improved water floating character as compared to that of the unprocessed raw materials. However, their floating percentages in water were not high enough to give satisfactory floating for long time. Furthermore, they all showed little oil sorption after short water contact. For instance, a sample of the sawdust product was stirred vigorously with fresh water until it was wetted, and it was found that the floating material had oil sorption legs than 1 ml/g, while no oil sorption was found in the control test with unprocessed raw material.

Example 2

Pretreatment With Acid or Base

Raw material was soaked in the acid or base solution at room temperature for 30 minutes. The raw material was then collected, pressed in a hand-press to remove excess solution and processed in the same condition as in Example 1. The 5-10% sodium hydroxide treated material had an additional washing step before processing. Raw materials tested: wood sawdust, wood chip, carton box, towel paper, straws, rice husk, peat moss, peanut husk, coconut husk, leaves, bark, bagasse, sugar sorghum, bean husks, corn stalk, cotton, grasses etc. Acids tested: citric acid, acetic acid, lactic acid, oxalic acid, malic acid, formic acid, nitric acid, phosphoric acid and phytic acid at 50-250 mM concentrations. Bases tested: saturated lime water, 5-10% sodium hydroxide.

All the products tested were found to have an improvement in oil sorption on water as compared to the products in Example 1. The pH of the acid-treated products was around 5-6, and the base-treated products around 7-8. A wide range of acids and bases can be used for improvement of the efficiency of the treatment process.

Example 3

Convection and Higher Temperature

The processing in Example 1 was repeated but the raw materials were pretreated with 0.2 M acetic acid, applying convection and higher temperature at 350° F. (177° C.) for 4-5 hours. Raw materials tested: wood sawdust, bamboo sawdust, grasses, peanut shell, corn leaf, corn stalk, corn silk, tobacco leaf,; tea leaf, straws, garlic peel, bagasse, sugar sorghum, wild rice stem, pine needle, bast, linen, ramie, carton box, cloth, crashed cotton seed, rice husk, bean husk, coconut husk, hair and paper.

It was found that there is some improvement in oil sorption and significant improvement of floating character and oil sorption after short water contact for all the products tested as compared to the products in Example 1. The products from sawdust, corn silk, coconut husk, tobacco leaf, grasses, bagasse and sugar sorghum showed the best improvement. For instance, a sample of the sawdust product was stirred vigorously with fresh water until it was wetted, and it was found that the floating material had oil sorption about 3.5 ml/g.

It was concluded that:
(1) Certain improvement of oil sorption and significant improvement of floating character and oil sorption after short water contact are obtained after processing with convection and higher temperature.
(2) The application of turbo convection distributes heat fast and evenly with fewer hot spot, thus, more oxygen and higher temperature could be applied without increasing the risk of the material smoking and catching fire.
(3) Processing at higher temperature has an expanding effect on the moistened raw material.

Example 4

Pretreatment With Boiling Water

Raw material was boiled in water for 10-30 minutes. The hot water was then poured out. After pressing in a hand-press to remove the excess water, the raw material was further soaked in 0.2 M acetic acid for 30 minutes, and pressed in a hand-press to remove the excess solution. The boiled, 0.2 M acetic acid treated raw material was then processed in the same conditions as in Example 3. Raw materials tested: wood sawdust, wood chip, tobacco leaf, bagasse, sugar sorghum and grasses.

All the products tested were found to have significant improvement in water floating character as compared to those in Example 3. For instance, a sample of the wood sawdust product was stirred vigorously with fresh water until it was wetted, and allowed to stand for 150 minutes at room temperature. The floating and sinking materials were then collected separately for volume measurement. The volume ratio was about 50 to 2, or 96% of the material was floating.

The test showed that:
(1) Water boiling is a practical and powerful pretreatment to improve the processing, especially to increase the hydrophobicity of the product.
(2) Some unknown substances in the natural materials, which can be washed out by hot water, might prevent the formation of hydrophobic substances.

Example 5

Pretreatment With Expanding Agent

Raw material was moistened by 20-50% (w/w) expanding agent solution or mixed solution of the agents in a sealed container for 1-2 hours and then processed in same condition as in Example 3 without acetic acid treatment. Raw materials tested: wood sawdust, bagasse and sugar sorghum. Expanding agents tested: ethanol, acetone, n-hexane, n-heptane, n-pentane and iso-pentane.

All the products tested were found to have significant improvement not only in water floating character but also in oil sorption after short water contact as compared to those in Example 3. For instance, 400 ml sawdust was moistened with a mixture of 10 ml 95% ethanol, 25 ml n-hexane and 20 ml water, sealed at room temperature for 1 hour and then processed in a 350° F. (177° C.), convected oven for 3 hours. After stirring vigorously with water, the product was 100% floating.

Thirty minutes later, oil sorption ability was found to be 5 ml oil per gram dry product.

Example 6

Pretreatment With Freezing

Moistened wood sawdust was frozen by adding liquid nitrogen, or by put into a −20° C. or −72° C. freezer for 1-2 hours. Then the frozen material was directly processed in a 350° F. (177° C.); convected oven for 4.5 hours.

All the products tested were found to have significant improvement not only in water floating character but also in oil sorption after short water contact as compared to those in Example 3. For instance, a sample of the liquid nitrogen treated product was stirred vigorously with fresh water and stayed at room temperature for 90 minutes, it was found 98% floating and an oil sorption of 3 ml oil per gram dry product.

Example 7

Relation Between Air Exposure and Hydrophobicity

Dry sawdust was wrapped in aluminum foil or buried in sand, then processed for 4 hours at 325° F. (163° C.), with turbo convection, positive pressure air flow and ozone supply. Exposed dry raw material was included as the control. It was found that the exposed product had a better oil sorption after short water contact (3.5 ml/g), while the wrapped and buried products had only a value of 2.6 ml/g.

Example 8

Pretreatment With Hydrogen Peroxide

Dry sawdust was moistened with 3% w/v hydrogen peroxide, then processed for 4 hours in the same condition as in Example 3. Water moistened raw material was included as the control. The hydrogen peroxide treated product had a better oil sorption after short water contact (4.5 ml/g), while the water treated product had a value of 3.5 ml/g.

Example 9

Preparation of Hydrophobic Oleophilic Sawdust-Based Materials in Different Oxidative Thermochemical Drying Conditions A series of hydrophobic oleophilic sorbents (Samples #2-11) made of sawdust (63 g, air dry) were prepared at temperatures of 300° F. and 350° F. (149° C. and 177° C.) for different periods of time, from dry or moistened or boiled raw material. The factors of convection, positive pressured airflow and supply of ozone in the oxidative thermochemical drying process were varied, while the other factors were kept constant. Sample #1 was dry sawdust without processing as the control sample. Samples #2-6 were processed directly from dry raw material, which was more vulnerable to catch fire or smoke if processed at 350° F. for long time. The moistened and water boiled raw materials of Samples #7-9 were pressed in a hand-press to remove a portion of the excess water before processing. Sample #9 had a lighter color than the other samples. Samples #1-11 were tested for comparison of oleophilic, hydrophobic and hydrophobic oleophilic character. The results are shown in Table 1 and Table 2.

TABLE 1

Oil Sorption and Oil Sorption after Short Water Contact of Samples #1-11

| Samples | Raw Material | Oven Convection | Positive Pressured Airflow | Ozone | Temperature, ° F. Duration (min) | Oil Sorption on Water (ml oil/g) | Oil Sorption after Short Water Contact (ml oil/g) |
|---|---|---|---|---|---|---|---|
| #1 | Dry Sawdust | No | No | No | — (—) | 6.0 | 0 |
| #2 | Dry Sawdust | Yes | Yes | Yes | 350 (60) | 6.5 | 3.5 |
| #3 | Dry Sawdust | Yes | Yes | No | 350 (60) | 5.5 | 3.5 |
| #4 | Dry Sawdust | No | No | No | 350 (16) | 6.0 | 3.5 |
| #5 | Dry Sawdust | No | Yes | Yes | 300 (180) | 6.0-6.5 | 4.0 |
| #6 | Dry Sawdust | No | Yes | No | 300 (180) | 6.5 | 3.5 |
| #7 | Moistened Sawdust | Yes | Yes | Yes | 350 (125) | 7.8 | 4.5-5.0 |
| #8 | Moistened Sawdust | Yes | Yes | No | 350 (125) | 7.5 | 3.5-3.8 |
| #9 | Water Boiled Sawdust | Yes | Yes | Yes | 350 (135) | 7.0 | 4.5-5.0 |
| #10 | Half Moistened Sawdust | Yes | Yes | Yes | 350 (120) | 6.5 | 4.5 |
| #11 | Half Moistened Sawdust | Yes | Yes | No | 350 (120) | 7.0 | 3.3-3.8 |

These tests showed that:

(1) Moisture content of the raw material is an important factor in the process. Dry raw materials should not be processed at high temperature.

(2) There is no difference in oil sorption for dry sawdust with and without processing.

(3) There is some improvement in oil sorption for the moistened raw material as compared to the dry one.

(4) There is a significant hydrophobic oleophilic improvement for sawdust, whether dry or moistened, after the thermochemical drying process as compared to the control sample.

(5) There is a significant hydrophobic oleophilic improvement for moistened and water boiled saw dust processed in the presence of ozone compared to that in the absence of ozone.
(6) There is some hydrophobic oleophilic improvement by using the moistened raw material as compared to the dry one.
(7) There is some hydrophobic oleophilic improvement by using the boiling water pretreated raw material as compared to the dry or moistened one.

TABLE 2

Percentage of the Sinking Material in Samples #1-11 after Initial Shaking with Water for Certain Time

| Hours after Initial Shaking with Water | #1 | #2 | #3 | #4 | #5 | #6 | #7 | #8 | #9 | #10 | #11 |
|---|---|---|---|---|---|---|---|---|---|---|---|
| 2.5 hr | 100 | 35 | 30 | 30 | 25 | 23 | 8 | 7 | <5 | 10 | 10 |
| 4.5 hr. | 100 | 55 | 50 | 45 | 35 | 35 | >15 | 15 | 10 | 40 | 35 |
| 7 hr. | 100 | 75 | 70 | 65 | 50 | 50 | <40 | >35 | >30 | 50 | 50 |
| 9 hr. | 100 | 75 | 75 | 70 | 50 | 50 | 40 | 40 | 33 | 50 | 50 |
| 12 hr. | 100 | 75 | 75 | 70 | 50 | 60 | 40 | 40 | 33 | 55 | 55 |
| 24 hr. | 100 | >90 | >90 | 85 | 65 | 70 | 60 | 55 | 45 | 70 | 70 |
| 36 hr. | 100 | >95 | >95 | >90 | 70 | 75 | 60 | 60 | 50 | 75 | 70 |
| 53 hr. | 100 | >95 | >95 | 95 | 80 | 80 | 65 | >65 | 50 | 80 | 75 |
| 72 hr. | 100 | 99 | >95 | 95 | 90 | 90 | 75 | 75 | 60 | >85 | 85 |
| 120 hr. | 100 | 100 | 100 | 98 | 100 | >95 | 90 | 95 | 95 | 100 | 100 |
| 144 hr. | 100 | 100 | 100 | 100 | 100 | 100 | 100 | 100 | 95 | 100 | 100 |

These results showed that:
(1) The test of water sorption and sinking/floating ratio is a good indicator of hydrophobic or hydrophilic character.
(2) There is a significant hydrophobic improvement for sawdust, whether dry or moistened, after the thermochemical drying process as compared to the control sample.
(3) There is no hydrophobic improvement for sawdust processed in the presence of ozone as compared to that in the absence of ozone.
(4) The risk of catching smoke and fire is much higher when dry raw material is processed than the moistened and boiled ones are, especially at higher temperature range. However, processing dry raw material at lower temperature for a longer time not only lowers the risk but also gives a high hydrophobicity.
(5) There is a significant hydrophobic improvement by using the moistened raw material as compared to the dry one.
(6) There is a significant hydrophobic improvement by using the boiling water pretreated raw material as compared to the dry or moistened one.

Example 10

Preparation of Hydrophilic Oleophilic Materials With Carbonate and Bicarbonate Under Different Conditions Sample #12: The raw material was prepared by mixing 30 ml 0.15 M sodium carbonate with 25 g air-dried sawdust. The raw material was then processed at 325° F. (163° C.) for 90 minutes, with turbo convection, positive pressured airflow and ozone supply. The product had a light brown color, pH 7-8.

Sample #13-15: The raw material was prepared by mixing 45 ml 0.30 M sodium bicarbonate with 25 g air-dried sawdust or carton box or bagasse. The raw materials were then processed at 325° F. (163° C.) for 1.5-2 hours, with turbo convection. The products had light brown color, pH 10-11.

All the Samples #12-15 showed a much faster wetting character in water than the unprocessed control materials. They also showed good oil sorption.

Example 11

Heating Temperature-Dependent Processing

Sample #16: 2% acetic acid treated sawdust raw material was processed at 350° F. (177° C.) for 2 hours, with convection, positive pressured airflow and ozone supply. The product had a brown color. A sample of the product was stirred vigorously with fresh water until it was wetted, and it was found that the floating material had oil sorption of 5.5 ml/g.

Sample #17: 2% acetic acid treated sawdust raw material was processed at 250° F. (121° C.) for 6.5 hours, with convection, positive pressured airflow and ozone supply. The product had a similar color as that of unprocessed raw material. A sample of the product was stirred vigorously with fresh water until it was wetted, and it was found that the floating material had oil sorption 2.7 ml/g.

This test showed that:
(1) A wide range of temperature is applicable in the process. Higher temperature for short time is more efficient than lower temperature for long time.
(2) The hydrophobic oleophilic character of the light colored product processed at low temperature is reasonably good. It suggests that pyrolytic reaction is not necessary for producing hydrophobic oleophilic substances.

Example 12

Heating Time-Dependent Processing

Two samples of moistened tree leaves were processed at 350° F. (177° C.), convection for 2 hours and 5 hours, respectively. Samples of the products were shaken vigorously with fresh water until it was wetted. The samples were then held at room temperature for 12 hours. Then the samples were again shaken vigorously, and floating characters were compared. It was found that the 5 hour-sample was still 40% floating, while the 2 hour-sample was only 10% floating.

Example 13

Replacement of Sorbed Water by Oil

Five grams of sawdust product processed at 350° F. (177° C.) for 2 hours in Example 11 was stirred with fresh water until it was wetted, poured out the water, and pressed the material in a hand-press to remove the excess water. Then the water-sorbed material (16.9 g) was mixed well with 30 ml waste motor oil. It was found that oil was sorbed and some water was released. Five minutes later, 3.5 g water was collected. Result analysis: The material was started with a water content of 2.38 g water/g sorbent, and ended with 1.68 g, water/g sorbent after adding oil. About 30 percent of sorbed water was replaced by oil. It was concluded that the sorbed water in the hydrophobic oleophilic sorbents could be partially replaced by oil and that the hydrophobic oleophilic sorbents have stronger affinity to oil than to water.

Example 14

Extractable Volatile Material in the Hydrophobic Oleophilic Product

Test 1: An aluminum foil placed in the reaction oven together with the raw materials became coated with some brown substances after processing at higher temperature. The substances were tested for solubility with the following solutions: water, isopropyl alcohol, gasoline, hydrogen peroxide, Esso® motor oil, Vim® Cleanser and Sunlight® dishwashing liquid. It was found that isopropyl alcohol is the only solvent that could dissolve the coated substances. The substances were dissolved in water partially, and not dissolved at all in gasoline and Esso® motor oil. The result suggests that the coated substances are both hydrophobic and hydrophilic.

Test 2: The following samples were shaken at room temperature for six days: (1) 20 g Sample #10 in Example 9 with 300 ml 70% isopropyl alcohol; (2) 20 g Sample #10 in Example 9 with 300 ml water; (3) 20 g sawdust raw material with 300 ml water. Then 20 g sawdust raw material was shaken with the used isopropyl alcohol collected from (1) for 30 minutes. These four samples were collected, pressed in a hand-press to remove the excess solution and then dried at 200° F. (93° C.), convected for 2 hours. The low temperature condition was designed for drying only, not for producing hydrophobic oleophilic substances. The oil sorption after short water contact for the isopropyl alcohol treated Sample #10 was 3.0 ml/g, while for the water treated Sample #10 was 3.7 ml/g, used isopropyl alcohol treated sawdust was 0.5 ml/g, and water-soaked sawdust was 0 ml/g.

Comments:
(1) Isopropyl alcohol is able to extract some volatile substances produced during the oxidative thermochemical; drying process.
(2) The lost ability for oil sorption of a water-saturated hydrophobic oleophilic sorbent could be recovered after a low-temperature drying process.
(3) The extractable volatile substances play an important role in hydrophobicity and oleophilicity. However, the extractable volatile substances in the hydrophobic oleophilic product are not the only, or even a major, reason for hydrophobic oleophilic character.

Example 15

Particle Size-Related Sorption

It was found that fine particles in the sawdust based hydrophobic oleophilic product sink to the bottom of water easier than the bigger particles. It suggests that fine particles may have poor hydrophobicity or lose hydrophobicity easily.

Test 1: Three screens with 14, 28 and 60 meshes respectively, were used to separate a sample of the smashed bark-based product from Example 16. Four different sized samples were collected and tested. It was found that when the sizes become smaller for the particle sizes over 60 mesh, the oil sorption and oil sorption after short Water contact were gradually increased, from 1.2 to 3.0 ml/g and from 0.8 to 2.0 ml/g, respectively. When the particle sizes Were smaller than 60 mesh, their oil sorption and water floating were not as good as that of the particles sized between 28 and 60 meshes.

Test 2: Some sample products from Example 3, including grasses, peanut shell, corn leaf, corn stalk, tobacco leaf, tea leaf, straws, garlic peel, bagasse, sugar sorghum, wild rice stem, pine needles, rice husk, bean husk and coconut husk, were pulverized. Oil sorption of each pulverized product was tested and compared with that of the corresponding non-pulverized one. It was found that the pulverized straw-type and stalk-type products have 20-100% increase of the oil sorption, while other type products have no change or even decrease of the oil sorption.

Comments:
The size of the product has an important influence on the sorption capacity. Smaller sized or thin layered generally gives better results.

Example 16

Hydrophobic Oleophilic Products From Different Raw Materials

Twenty-seven different raw materials were processed at 300-400° F. for different times, with convection, positive pressure airflow and ozone supply. Oil sorption (OS) and the oil sorption after short water contact (OSW) were tested.
(1) Absorbent cotton, moistened with water, 350° F. for 4.5 hours. OS: 30-32 ml/g. OSW: 12-14 ml/g.
(2) Bagasse, peeled off, munched, boiled in water, 375° F. for 2.5 hours. OS: 10 ml/g. OSW: 7.5 ml/g.
(3) Bark, smashed, moistened with water, 375° F. for 2 hours. OS: 2.0 ml/g. OSW: 1.2 ml/g.
(4) Coconut husk, split, moistened with water, 375° F. for 2 hours. OS: 8 ml/g. OSW:. 7 ml/g.
(5) Grasses, boiled in water, 350° F. for 2 hours. OS: 7-8 ml/g. OSW: 4-5 ml/g.
(6) Kapok fibers, moistened with water, 350° F. for 5 hours. OS: 30-32 ml/g. OSW: 20 ml/g.
(7) Moss, boiled in water; 350° F. for 2 hours. OS: 6-7 ml/g. OSW: 4-5 ml/g.
(8) Peanut shell, moistened with water, 350° F. for 3 hours. OS: 2.5 ml/g. OSW: 0.5 ml/g.
(9) Pine needle, moistened with water, 350° F. for 2 hours. OS: 3.3 ml/g. OSW: 1.2 ml/g.
(10) Reed, cut, moistened with water, 375° F. for 3 hours. OS: 9.0 ml/g. OSW: 8.5 ml/g.
(11) Seaweed, moistened with water, 350° F. for 1 hour. The product showed a better hydrophobicity than the unprocessed seaweed.

(12) Sugar sorghum, peeled off, munched, boiled in water, 375° F. for 2.5 hours. OS: 18 ml/g. OSW: 14 ml/g.
(13) Tobacco leaf, moistened with water, 375° F. for 2 hours. OS: 8 ml/g. OSW: 6 ml/g.
(14) Tree leaves, boiled in water, 350° F. for 2 hours. OS: 5.0-13.0 ml/g. OSW: 2.0-8.0 ml/g.
(15) Unknown wild shrub, cut, moistened with water, 350° F. for 2.5 hours. OS: 6-7 ml/g. OSW: 5 ml/g.
(16) Wild rice stem, fresh, cut, 375° F. for 4 hours. OS: 10 ml/g. OSW: 8 ml/g.
(17) Wood chip, boiled in water, 350° F. for 4.5 hours. OS: 6.0 ml/g. OSW: 5.0 ml/g.
(18) Agar powder, moistened with water, 350° F. for 1 hour. The product showed a better hydrophobicity than the unprocessed agar powder.
(19) Coffee powder, Nestle®, dry, 350° F. for 1 hour. The product showed a better hydrophobicity than the unprocessed coffee.
(20) Wheat flour, dry, 375° F. for 25 min and 350 F. for 40 min. The product showed a better hydrophobicity than the unprocessed wheat flour.
(21) Peat moss, Sunshine®, moistened with water, 350° F. for 90 minutes. OS: 8.0 ml/g. OSW: 4.3 ml/g.
(22) Carton box, cut, boiled in water, 350° F. for 2 hours. OS: 3.5 ml/g. OSW: 0.8 ml/g.
(23) Soybean, fully swollen in water, smashed, 350° F. for 2.5 hours. OS: 3.0 ml/g. OSW: 2.0 ml/g.
(24) Egg albumin, 350° F. for 4 hours. The product showed a better hydrophobicity than the unprocessed egg albumin.
(25) Shrimp shell, smashed, moistened with water, 375° F. for 2.5 hours. The product showed a better hydrophobicity than the unprocessed shrimp shell.
(26) Charcoal, smashed, moistened with water, 350° F. for 60 min and 400° F. for 15 min. The product showed a better hydrophobicity than the unprocessed charcoal.
(27) Cloth (50% cotton, 50% polyester), moistened with water, 375° F. for 2 hours. The product showed a better hydrophobicity than the unprocessed cloth.

Example 17

Sorption of Organic Substances

The sorption ability of 2.5 g sawdust sorbent from Example 3 for various oils and organic substances was tested with 15 ml tested natural organic substance in 200 ml water. Some examples of tested oils and organic reagents are: gasoline, motor oil, paraffin, crude oil, canola oil, corn oil, coolants, paints, acetone, aniline, benzene, carbon tetrachloride, chloroform, cyclohexane, dichloromethane, diethanolamine, ethanol, ethyl ether, formaldehyde heptane, hexane, isobutanol, isopropanol, methanol, pentane, petroleum ether, phenol, propanol, propylene glycol, tetrahydrofuran, toluene, and xylene. The sorbent showed good sorption to all the tested organic substances. In the case of hydrocarbons with higher density than water, such as aniline, methyl benzoate, benzyl alcohol, carbon tetrachloride, diethanolamine, dimethyl phthalate and ethylacetoacetate, the hydrocarbons sink to the lower phase after mixing with water. When the sorbents are applied to the surface of water phase and shaken, they will rapidly sink to the lower phase to sorb the chemical.

Comments:

The sorbents in the present invention are able to bind a wide, range of organic substances, whether they are lighter or heavier than water, making them useful in industrial waste cleaning.

Example 18

Sorption of Toxic Metal Ions

A modified dithizone method was used for measuring concentrations of heavy metal ions.

Test 1: g sugar sorghum product from Example 3 was shaken with 50 ml 20 μg $Pb^{2+}$/ml solution for 4 hours. $Pb^{2+}$ concentration was reduced to 8.8-9.0 μg/ml. The clearance efficiency for lead ions in this case was 55%.

Test 2: 1 g sugar sorghum product front Example 3 was shaken with 50 ml 20 μg $Hg^{2+}$/ml solution for 30 minutes. $Hg^{2+}$ concentration was reduced to 4.8 μg/ml. The clearance efficiency for mercuric ions in this case was 76%.

Test 3: 1 g sugar sorghum product from Example 3 was shaken with 50 ml 20 μg $Hg^{2+}$/ml solution and 5 ml waste motor oil for 30 minutes. $Hg^{2+}$ concentration was reduced to 10 μg/ml. All the oil was sorbed. The clearance efficiency of mercuric ions in the presence of oil in this case was 50%.

Comments:

The sorbents in the present invention are able to bind toxic metal ions from contaminated water and even from oil-contaminated water.

Example 19

Application of Sorbent in Different Environmental Conditions

Test 1. Emulsified oil sorption: Waste motor oil was shaken vigorously with fresh water up and down for 2 minutes to make partially emulsified oil. A sample of sample #7 from Example 9 was tested for the emulsified oil, and it was found that the emulsified oil sorption was 3.5 ml/g.

Test 2. Oil sorption in presence of detergent: A sample of Sample #7 was tested for oil sorption in soap solution and dish washing solution, and it was found that there was no oil sorption at all.

Test 3. Oil sorption at different pHs: Oil sorption of Sample #7 in 0.5% acetic acid, 5% acetic acid, 10% sodium bicarbonate and 0.1 M sodium hydroxide was tested as 4.0, 3.3, 4.0 and 1.5 ml/g, respectively.

Test 4. Oil sorption at high sodium chloride concentration: Emulsified oil sorption in 5% and 30% sodium chloride for Sample #7 Was tested as 3.5 and 3.2 ml/g, respectively.

Test 5. Oil sorption at different temperatures: Oil sorption in boiling Water and iced water for Sample #7 was tested as 3.0 and 4.0 ml/g, respectively.

Comments:
(1) The hydrophobic oleophilic sorbents of the present invention have good sorption of emulsified oil.
(2) The sorbents are not workable in presence of detergent.
(3) The sorbents are workable in widely applicable environmental conditions.

Example 20

Fast Column Application

Test 1: 15 g grass product from Example 16 was packed into a 3.7 cm diameter×28 cm long column supported with a layer of cotton gauze. Prepared partially emulsified oil by shaking vigorously 25 ml waste motor oil and 100 ml water for 2 minutes. The partially emulsified oil was poured into the column. The fluid was passed through the column in seconds. A highly diluted somewhat milky solution was collected.

Test 2: 150 ml grass product from Example 16 was packed into a simple 500 ml column. Then a mixture of 150 ml bagasse product from Example 16 and 100 ml sawdust product from Example 3 was further packed into the column. 50 ml waste oil with 200 ml water was poured into, the column. Water passed through the column very fast. No oil was observed in the eluate. No oil leaking was found in the following two days.

Test 3: Fifteen grams of grass product from Example 16 was packed into a 3.7 cm diameter×28 cm long column supported with a layer of cotton gauze. Two hundred ml of heated meat soup was prepared with 50 ml cooking oil in it. The soup was poured into the column. It was observed that water passed through the column very fast. No oil was observed in the eluate.

Comments:
(1) Column application of the products in the present invention is fast and efficient to remove oil or emulsified oil from contaminated water.
(2) Column application of the products in the present invention can be further used to treat greasy hot water produced from food industry and restaurants.

Example 21

Oil Cleaning on Water Surface

Test 1: A sample of sawdust product processed at 350° F. in Example 11 was filled into a boom type bag made of cotton gauze, and samples of grasses, tree leaves and bagasse products from Example 16 were filled into plastic netted flat bags. When the above sorbent materials were thrown onto a 2 mm oil covered water surface, they showed fast and efficient oil cleaning for the covered area. When the sorbent materials and the surrounding Water surface were stirred, then the surrounding oil could also be effectively removed.

Test 2: Ten grams of smashed soybean product from Example 16 was filled into a flat bag made of cotton gauze. When this sorbent material was thrown into boiling meat soup with 20 ml cooking oil, a rapid oil-removing effect was observed.

Comments:
(1) The use of the products of invention for spill cleaning are both practical and efficient.
(2) An oil or grease sorbing bag can be used to remove or partially remove the fat, oil, grease in food in order to get healthy food.

Example 22

Sorption Paper

Test 1: A mixture of sawdust and straws was pulverized with some absorbent cotton. 20% alcohol was added to make pulp. The pulp was spread on a piece of towel paper, then heated at 350° F. (177° C.), convected for 5 hours. The crude paper product was water-resistant and had good oil sorption.

Test 2: A paper was moistened with water and processed at 375° F. (191° C.), convected, with positive pressured airflow and ozone supply for 3 hours. The paper product had good hydrophobicity and oleophilicity.

Example 23

Use of Hydrophobic Oleophilic Sorbents for Cigarette Filtration

Tobacco tar in cigarette smoke contains many hydrophobic oleophilic carcinogens. Nicotine can be dissolved not only in water but also in organic solvents in any ratio, which means it is not only hydrophilic but also oleophilic. Filter tips on cigarettes are designed mainly for the tar and nicotine reduction. Cellulose acetate is currently the most popular commercial cigarette filter material. However, cellulose acetate is highly hydrophilic: it sinks in water within seconds. The hydrophobic oleophilic, low cost, non-toxic, natural sorbents in the present invention are more effective than cellulose acetate for removing the hydrophobic, toxic gaseous substances in cigarette smoke.

Several popular brands of cigarettes, herb blend and flue-cured type, with tar ranged from 10 mg to 15 mg, were selected for the test. Most of the cigarettes had a 2 cm cellulose acetate filter, and one of the cigarettes had a filter comprised of 1 cm of cellulose acetate and 1 cm of combined activated charcoal and cellulose acetate. The cellulose acetate filter tips, after peeling off the wrapped paper, weighed 0.10-0.12 g. A commercial health cigarette holder (Chinese Patent, ZL9520735LX, ZL96213148.2) made of transparent plastics, which are able to capture and accumulate some tobacco tar and other colored substances as a visible indication of the amount of tobacco tar from cigarette smoke, was used as a simple tar detector and a holder for the filled hydrophobic oleophilic sorbent. Two control tests, one with defiltered cigarette, and another one with filter of the cellulose acetate on cigarette, were always included for each test. Filter samples tested were as followed:

0.05-0.2 g of sawdust based Sample #9 in Example 9
0.05-0.2 g of tobacco leaf based sorbent in Example 16
0.02-0.1 g of bagasse based sorbent in Example 16
0.02-0.1 g of sugar sorghum based sorbent in Example 16
0.02-0.1 g of absorbent cotton based sorbent in Example 16
0.05-0.2 g of corn silk based sorbent in Example 3

All the samples showed a significant reduction of the accumulation of tar and other colored substances on the detector.

Comments:
(1) All the six sorption materials tested were tried successfully as the cigarette filter. They showed much better binding of tar and other hydrophobic substances than the cellulose acetate filter based on the same weight comparison. Sugar sorghum, bagasse and decreased cotton based sorption materials are among the best in terms of binding capacity and efficiency. The possibility of using tobacco leaf material for cigarette filtration is very attractive. The hydrophobic oleophilic sorbents are very promising filter material for cigarette smoke. They can be used separately or combined for filtration. If the hydrophobic oleophilic sorbents are used together with the existing commercial hydrophilic filtration materials, then a more efficient filtration function can be expected.
(2) Some factors significantly influence the efficiency and the use of the hydrophobic oleophilic sorbents as cigarette filter to remove tar and other hydrophobic substances, such as the amount, particle size and packing density of sorbent, and the shape of the filter. Larger quantity, fine sized, loosely but evenly packed, and longer but thinner shaped filtration result in higher efficiency.

(3) The binding efficiency of the hydrophobic oleophilic sorbents to the tar and other gaseous hydrophobic substances is amazingly high, even if is operated in a fast flow rate as in cigarette smoke.

Example 24

Test of Bagasse Based Sorbent for Sorption of Gaseous Formaldehyde

Five ml formaldehyde solution (36-40%) was pipetted into a 10 ml beaker, which was put into a 300 ml bottle, then 2 g of sugar sorghum sorbent from Example 3 was put into the bottle beside the beaker. The bottle was sealed and incubated at 60° C. overnight. A control sample was prepared as above, except that no sorbent was added. The bottles were opened, and the volumes of formaldehyde in the beakers for control and sorbent were measured, 4.5 ml and 4.2 ml, respectively. The sugar sorghum sorbent had a very strong smell of formaldehyde. It indicated that the sorbent had a good binding of gaseous formaldehyde. The sorbent was spread evenly onto a 15 cm petri dish, exposed to open air at room temperature. After 2 hours, the smell from the sorbent was still very strong. After 6 hours, the smell was quite strong. After 17 hours, the smell was strong. After 28 hours, the smell was much weaker. The result indicates that the hydrophobic oleophilic sorbent has the ability of not only binding the gaseous organic material but also holding the material for long time. It suggests the use of the sorbents as carrier and slow releaser.

Example 25

Use of Hydrophobic Oleophilic Sorbent for Cleaning Oil-Contaminated Sand and Oil-Contaminated Soil Test 1: Cleaning of oil-contaminated sand: 25 ml waste motor oil was poured onto 1 cm deep moistened sand in a 17×9.5 cm container and mixed. 15 g sorbent (Sample #9 from Example 9) was applied to the oil-soaked sand, continuously mixed and allowed to pick up the oil for 5 minutes. Water was added and stirred well. The oil-sorbed sorbent and un-sorbed one floated on the surface of water. The floating material was collected as much as possible. Then the sand was stirred to get more sorbent out of the sand to the surface of water, and collected. The stirring and collecting was repeated until no more sorbent floated up. The water was poured out of the sand. The sand was checked by hand and was found to have just a little oily feeling. Another 5 g sorbent was applied to the sand and the above procedure was repeated. The sand was again checked by hand. It was found that the sand was very clean, with no oily feeling at all.

Test 2: Cleaning of oil-contaminated soil: 100 g air-dried soil, pulverized by hand, was prepared, 50 ml waste motor oil (45 g) was poured onto the soil, mixed well. 30 g sorbent (Sample #9 from Example 9) was applied to the oil-soaked soil, continuously mixed and allowed to pick up the oil for 10 minutes. Water was added and stirred vigorously. The volume of water was at least ten times that of the soil in order to permit the sorbent to float freely to the surface of the water. The oil-sorbed sorbent and un-sorbed one floated on the surface of water. The floating material was collected as much as possible. Then the muddy water was stirred vigorously to get more sorbent material out of the soil to the surface of water, and the sorbent was collected. The stirring and collecting was repeated until no more sorbent floated up. When the water was clear, the Water Was poured out of the soil as much as possible. The soil Was checked by hand and was found to have just a little oily feeling. It was estimated that at least 90 percent of the oil was cleaned out of the oil-soaked soil by the above procedure. The collected sorbent mix was pressed in a hand-press to remove a portion of the excess water and weighted 128 grams. If 90 percent of the oil was sorbed and collected, then the 30 g sorbent was estimated to have sorbed 40.5 g oil and 57.5 g water. When 10 g sorbent was added to the above treated soil to do a second cleaning cycle, a satisfactory result was obtained with almost no oily feeling of the soil.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A method of increasing the hydrophobicity and oleophilicity of a natural organic substance, comprising the steps of:
   (a) providing a moistened, natural organic substance;
   (b) heating said organic substance in an oxidizing medium at a temperature in the range of 80°-700° C. for a time period in the range of 16 minutes to 24 hours, while, at the same time, flowing said oxidizing medium over said organic substance, such that said organic substance is oxidized by said oxidizing medium, and that moisture and volatile substances are given off from said organic substance and are removed by said flowing oxidizing medium; and
   (c) cooling the treated organic substance to ambient temperature.

2. A method according to claim 1 wherein said temperature is in the range of 110°-300° C.

3. A method according to claim 1 wherein said time period is in the range of 1 hour to 10 hours.

4. A method according to claim 1 wherein said oxidizing medium comprises air, or oxygen, or ozone, or steam and ozone, or hydrogen peroxide, or combinations thereof.

5. A method according to claim 1 wherein said heating step is carried out in a wet oxidizing medium for a first period of time and in a dry oxidizing medium for a second period of time.

6. A method according to claim 1 wherein said step of heating is carried out at a relatively higher temperature for a first period of time and at a relatively lower temperature for a second period of time.

7. A method according to claim 1 wherein said oxidizing medium comprises a medium having a relatively higher concentration of oxidant during a first period of time of said heating step and comprises a medium having a relatively lower concentration of oxidant during a second period of time of said heating step.

8. A method according to claim 1 wherein said heating step is carried out in the presence of a catalyst that catalyzes oxidation of said organic substance.

9. A method according to claim 1 further including the step of treating said organic substance to increase the reactivity of oxidation and porosity thereof and to expose reacting groups therein to said oxidizing medium, prior to said heating step, said step of treating comprising at least one of (i) soaking said organic substance in boiling water, (ii) soaking said organic substance in acidic or alkaline solution, (iii) expanding said organic substance by mechanical expansion, (iv) applying a volatile reagent to said organic substance, (v) freezing said organic substance, and combinations thereof.

10. A method according to claim 1 wherein said organic substance is a substance containing a polysaccharide, heteropolysaccharide, lignin, polyphenol, protein, or humus, and combinations thereof.

11. A method according to claim 1 wherein said organic substance is selected from the group comprising wood, barks, leaves, straws, stalks, husks, shells, roots, flowers, seeds, beans, grasses, piths, flours, seaweed, sponge, bagasse, sugar sorghum, sugar beet, rice, wheat, corn, rye, barley, oats, millet, bast, linen, ramie, peanut, oil palm, tobacco, tea, cotton, cloth, papers, carton boxes, pulps, composted municipal wastes, yard wastes, mushroom culture residues, feathers, wool, hairs, algae, fungi, bacteria, peat moss, lignite, charcoal, crab shells and shrimp shells, waste organic sludge, bacterial culture, and mixtures thereof.

12. A method according claim 1 wherein said method introduces chemical functional groups into said natural organic substance.

13. A method of increasing the hydrophilicity of a natural organic substance, comprising the steps of:

(a) applying a solution of a carbonate or bicarbonate composition to said natural organic substance;

(b) heating said organic substance in an oxidizing medium at a temperature in the range of 80°-700° C. for a time period in the range of 1 minute-24 hours, while, at the same time, flowing said oxidizing medium over said organic substance, such that moisture and volatile substances are given off from said organic substance and are removed by said flowing oxidizing medium; and (c) cooling the treated organic substance to ambient temperature.

* * * * *